(12) United States Patent
Batalden et al.

(10) Patent No.: US 7,890,651 B2
(45) Date of Patent: Feb. 15, 2011

(54) SENDING CONTENT FROM MULTIPLE CONTENT SERVERS TO CLIENTS AT TIME REFERENCE POINTS

(75) Inventors: Glenn Darrell Batalden, Rochester, MN (US); Timothy Pressler Clark, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 11/762,347

(22) Filed: Jun. 13, 2007

(65) Prior Publication Data

US 2008/0313268 A1   Dec. 18, 2008

(51) Int. Cl.
G06F 15/16 (2006.01)

(52) U.S. Cl. .................. 709/236; 709/214; 709/216; 709/219; 709/231

(58) Field of Classification Search ................ 709/214, 709/203
See application file for complete search history.

(56) References Cited

U.S. PATENT DOCUMENTS

| | | | |
|---|---|---|---|
| 5,561,456 | A | 10/1996 | Yu |
| 5,568,181 | A | 10/1996 | Greenwood et al. |
| 5,594,924 | A | 1/1997 | Ottesen et al. |
| 5,610,841 | A | 3/1997 | Tanaka |
| 5,630,104 | A | 5/1997 | Ottesen et al. |
| 5,930,252 | A | 7/1999 | Aaker et al. |
| 6,715,126 | B1 | 3/2004 | Chang et al. |
| 6,970,939 | B2 * | 11/2005 | Sim ........................... 709/236 |
| 7,548,984 | B2 * | 6/2009 | Kurauchi .................... 709/231 |
| 2003/0026254 | A1 * | 2/2003 | Sim .......................... 370/392 |
| 2003/0103564 | A1 | 6/2003 | Hanaki |
| 2006/0089997 | A1 * | 4/2006 | Inokuchi ..................... 709/228 |
| 2006/0212668 | A1 | 9/2006 | Furukawa |

OTHER PUBLICATIONS

U.S. Appl. No. 11/381,382, entitled "Apparatus and Method for Serving Digital Content Across Multiple Network Elements," filed May 30, 2006 by Glenn Batalden et al.
U.S. Appl. No. 11/466,820, entitled "Method for Implementing On-Demand PVR Peer-to-Peer Media Sharing with Content Restraint," filed Aug. 24, 2006 by Byron L. Bailey et al.
U.S. Appl. No. 11/523,680, entitled "On Demand Dynamic Advertisement Insertion in an Internet Protocol Stream," filed Sep. 19, 2006 by David C. Olds.
"IPTV/Triple Play Testing—Screen Test," European Communications, Oct. 4, 2005, http://www.eurocomms.co.uk/features/features.ehtml?o=966.
Software Summary, http://www.cisco.com/univercd/cc/td/doc/product/aggr/10000/swconfig/swref/tech-edg/ch4sw....

* cited by examiner

*Primary Examiner*—Yves Dalencourt
(74) *Attorney, Agent, or Firm*—Owen J. Gamon

(57) ABSTRACT

In an embodiment, a request is received from a client that includes a content identifier that identifies content. Content servers are determined that store the content, which is divided into frames. Time reference points and a time period are determined. The time period separates each of the time reference points. Logical groups of the frames are sent from the content servers to the client at the time reference points. The client receives the frames, reorders the frames into a play order, and displays the frames in the play order.

10 Claims, 8 Drawing Sheets

| | | | | | |
|---|---|---|---|---|---|
| SCHEDULE | | | | | 156 |
| CONTENT SERVER ID (425) | CONTENT ID (430) | INITIAL TIME REFERENCE POINT (435) | NUMBER OF LOGICAL GROUPS (440) | CLIENT ID (445) | |
| CONTENT SERVER A | LOGICAL GROUP A, B | TIME REFERENCE POINT A | 2 | CLIENT A | 405 |
| CONTENT SERVER A | LOGICAL GROUP C | TIME REFERENCE POINT D | 1 | CLIENT A | 410 |
| CONTENT SERVER B | LOGICAL GROUP D | TIME REFERENCE POINT C | 1 | CLIENT A | 415 |
| CONTENT SERVER B | LOGICAL GROUP E, F | TIME REFERENCE POINT E | 2 | CLIENT A | 420 |

450 LOGICAL GROUP SIZE (NUMBER OF FRAMES IN LOGICAL GROUP)

455 AMOUNT OF TIME BETWEEN TIME REFERENCE POINTS

FIG. 4

SENDING CONTENT FROM MULTIPLE CONTENT SERVERS TO CLIENTS AT TIME REFERENCE POINTS

CROSS-REFERENCE TO RELATED APPLICATIONS

The present application is related to commonly-assigned patent application Ser. No. 11/762,352, to Glenn D. Batalden, et al., filed Jun. 13, 2007, entitled "DETERMINING A TRANSMISSION ORDER FOR FRAMES BASED ON BIT REVERSALS OF SEQUENCE NUMBERS," which is herein incorporated by reference. The present application is also related to commonly-assigned patent application Ser. No. 11/762,429, filed Jun. 13, 2007, entitled "SENDING CONTENT FROM MULTIPLE QUEUES TO CLIENTS," which is herein incorporated by reference.

FIELD

An embodiment of the invention generally relates to transmitting content from multiple content servers to clients at time reference points.

BACKGROUND

Years ago, computers were isolated devices that did not communicate with each other. But, computers are increasingly being connected together in networks. One use of this connectivity is for a technology called Video on Demand, which provides real-time and near real-time audio and video transmission over networks at times requested by viewers. One example of Video on Demand is called IPTV (Internet Protocol Television), which provides television programming over the Internet.

Video on Demand is increasing in popularity, and its growing customer base is straining the traditional computing, storage, and network architectures that support it. In addition, as the quality of the video content moves from the traditional TV format to HDTV (High Definition Television), more network bandwidth is needed to support even the same number of customers. For these reasons, systems which distribute video content must be able to do so with ever-increasing speed and efficiency.

The Video on Demand technology uses a client device (e.g., a set-top box) at a customer's location to receive video or TV frames from content servers connected via the network. A control system mediates requests between the customer and the content servers. Existing techniques require a high degree of communication between the customer, the control system, and the content servers. This communication increases the computational load and subtracts from the network bandwidth available to transmit the video content. In addition, existing techniques do not adequately facilitate providing video on demand when the video originates from multiple content servers, e.g., one content server providing the video the customer requested, another content server providing advertisements, and yet another content server providing reports of severe weather, emergencies, or important news.

Thus, what is needed is an enhanced technique for the delivery of on-demand audio/video data in a network.

SUMMARY

A method, apparatus, system, and storage medium are provided. In an embodiment, a request is received from a client that includes a content identifier that identifies content. Content servers are determined that store the content, which is divided into frames. Time reference points and a time period are determined. The time period separates each of the time reference points. Logical groups of the frames are sent from the content servers to the client at the time reference points. The client receives the frames of a logical group, reorders the frames into a play order, and displays the frames in the play order. In this way, in an embodiment, frames may be sent from multiple content servers to a client and played at the client, in a next-in-time manner, without the need for buffering the frames.

BRIEF DESCRIPTION OF THE DRAWINGS

Various embodiments of the present invention are hereinafter described in conjunction with the appended drawings:

FIG. 4 depicts a block diagram of an example schedule, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a control server receives a request from a client that identifies content. The control server determines content servers that store the content as frames. The control server further determines schedules for the content servers. The schedules identify time reference points, a time period between time reference points, sizes of logical groups of frames, and the content to be sent. The control server sends the schedules to their respective content server, each of which sends its respective logical groups of frames, at its respective time reference points, which are different, to the client. The time period is equal to the round trip latency of sending the logical group of frames to the client. The size of a logical group is the play frame rate (the rate at which frames are played at the client) multiplied by the round trip latency. The client reorders the frames, within their respective logical groups, from a received order to a play order and plays the frames in the play order during a time period after the time period during which the logical group was received. In this way, in an embodiment, frames may be sent from multiple content servers to a client and played at the client, in a next-in-time manner, without the need for buffering the frames.

Figure 1:
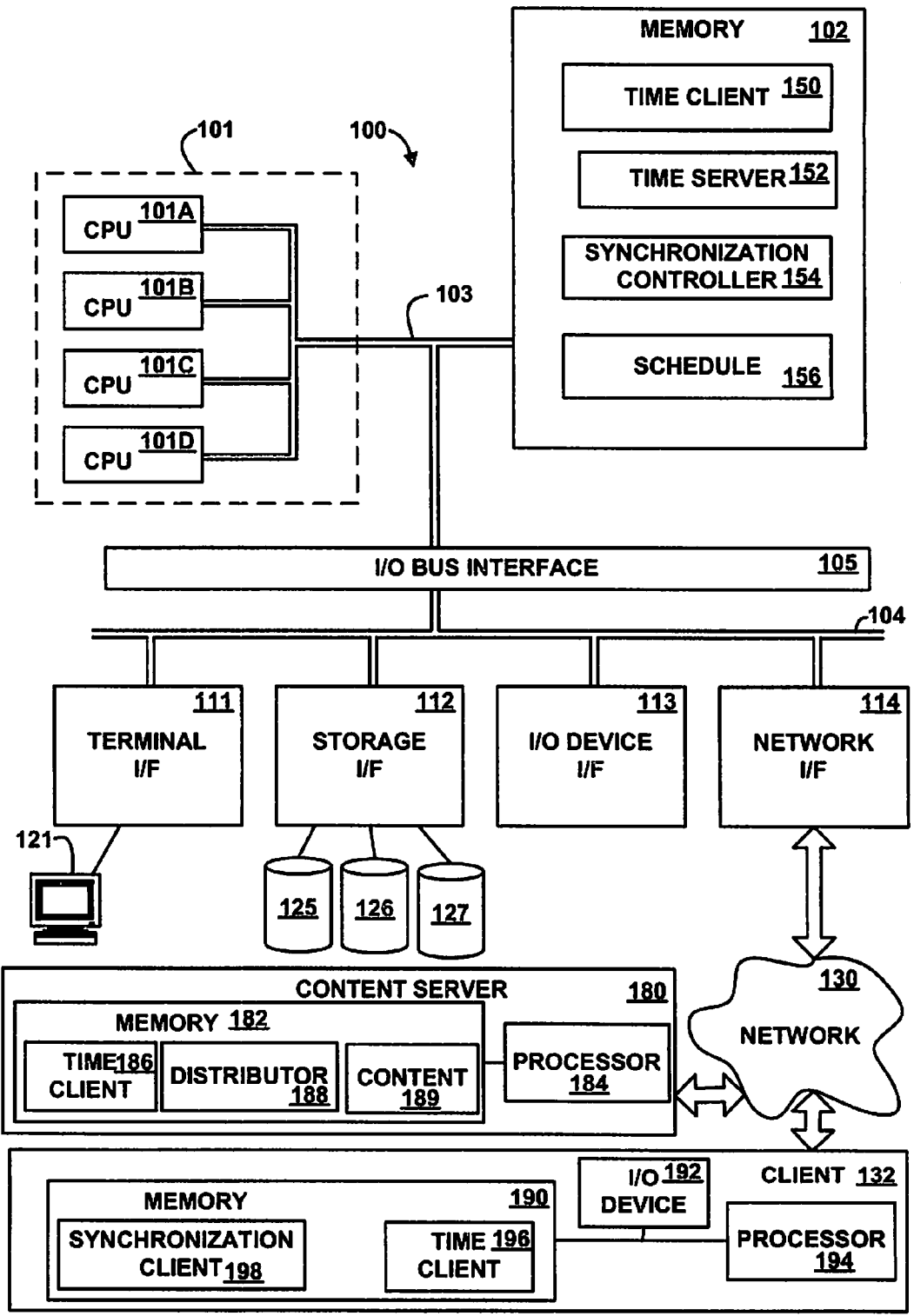
FIG. 1 depicts a high-level block diagram of an example system for implementing an embodiment of the invention.

Referring to the Drawings, wherein like numbers denote like parts throughout the several views, FIG. 1 depicts a high-level block diagram representation of a control server computer system 100 connected to a client computer system 132 and a content server computer system 180 via a network 130, according to an embodiment of the present invention. The terms "client" and "server" are used herein for convenience only, and in various embodiments a computer system that operates as a client in one environment may operate as a server in another environment, and vice versa. In an embodiment, the hardware components of the computer systems 100 and 180 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also represent the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a time client 150, a time server 152, a synchronization controller 154, and a schedule 156. Although the time client 150, the time server 152, the synchronization controller 154, and the schedule 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the time client 150, the time server 152, the synchronization controller 154, and the schedule 156 are illustrated as being contained within the main memory 102, these elements are not necessarily all completely contained in the same storage device at the same time. Further, although the time client 150, the time server 152, the synchronization controller 154, and the schedule 156 are illustrated as being separate entities, in other embodiments some of them, portions of some of them, or all of them may be packaged together.

In an embodiment, the time client 150, the time server 152, and/or the synchronization controller 154 include instructions capable of executing on the processor 101 or statements capable of being interpreted by instructions that execute on the processor 101, to carry out the functions as further described below with reference to FIG. 7. In another embodiment, the time client 150, the time server 152, and/or the synchronization controller 154 are implemented in hardware via logical gates and other hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device).

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers or fax machines. The network interface 114 provides one or more communications paths from the computer system 100 to the client 132 and the content server 180; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer systems 100, 132, and 180 may be multi-user "mainframe" computer systems, single-user systems, or servers or similar devices that have little or no direct user interface, but receives requests from other computer systems (clients). In other embodiments, the computer systems 100, 132, and 180 may be implemented as personal computers, portable computers, laptop or notebook computers, PDAs (Personal Digital Assistants), tablet computers, set-top boxes, television sets, game consoles, pocket computers, telephones, pagers, automobiles, teleconferencing systems, appliances, or any other appropriate type of electronic devices.

The network 130 may be any suitable network or combination of networks and may support any appropriate protocol suitable for communication of data and/or code to/from the computer system 100, the client computer system 132 and the content server 180. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The client 132 may be implemented as a computer system, a set-top box, a television set, a game console, or a digital video recorder (DVR) and may include some or all of the hardware components previously described above as being included in the control server computer system 100. The client 132 includes memory 190 connected to an I/O (Input/Output) device 192 and a processor 194. The memory 190 is a semiconductor memory that stores a time client 196 and a synchronization client 198.

In an embodiment, the time client 196 and/or the synchronization client 198 include instructions capable of executing on the processor 194 or statements capable of being interpreted by instructions that execute on the processor 194, to carry out the functions as further described below with reference to FIG. 7. In another embodiment, the time client 196 and/or the synchronization client 198 are implemented in hardware via logical gates and other hardware devices in lieu of, or in addition to, a processor-based system. The I/O device 192 may include user output devices (such as a video display device, speaker, and/or television set) and user input devices (such as a keyboard, mouse, keypad, touchpad, trackball, buttons, light pen, or other pointing device). The processor 194 executes instructions and has a description analogous to the processor 101.

The content server 180 may be implemented as a computer system and may include some or all of the hardware components previously described above as being included in the control server computer system 100. The content server 180 includes memory 182 connected to a processor 184. The memory 182 is a semiconductor memory that stores a time client 186, a distributor 188, and content 189. The content 189 may include video, audio, images, data, control data, formatting data, frame numbers, or any multiple or combination thereof, capable of being played or displayed via the I/O device 192. Examples of the content 189 are further described below with reference to FIGS. 3A and 3B. In an embodiment, the time client 186 and/or the distributor 188 include instructions capable of executing on the processor 184 or statements capable of being interpreted by instructions that execute on the processor 184, to carry out the functions as further described below with reference to FIG. 7. In another embodiment, the time client 186 and/or the distributor 188 are implemented in hardware via logical gates and other hardware devices in lieu of, or in addition to, a processor-based system.

It should be understood that FIG. 1 is intended to depict the representative major components of the control server computer system 100, the network 130, the client computer system 132, and the content server computer system 180 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., and are referred to hereinafter as "computer programs." The computer programs typically comprise one or more instructions that are resident at various times in various memory and storage devices in the server computer system 100, the client 132, and the content server computer system 180, and that, when read and executed by one or more processors in the control server computer system 100, the client 132, and the content server 180 cause the control server computer system 100, the client 132, and/or the content server 180 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the server computer system 100, the client 132, and/or the content server 180 via a variety of tangible signal-bearing media that may be operatively or communicatively connected (directly or indirectly) to the processor or processors, such as the processor 101, the processor 184, and the processor 194. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, 182, and 190, CD-RW, or diskette; or (3) information conveyed to the control server computer system 100, the client 132, and/or the content server 180 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
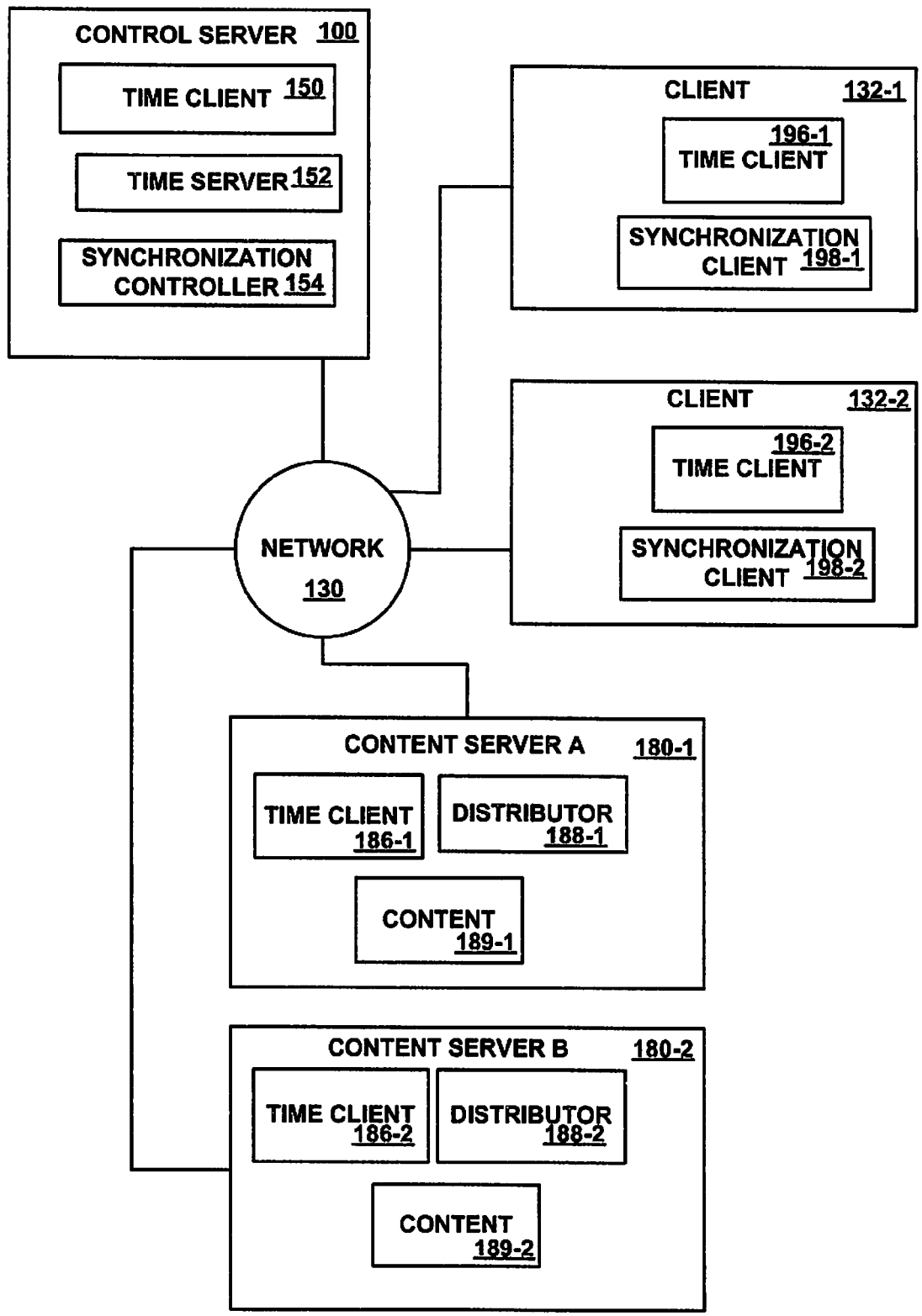
FIG. 2 depicts a high-level block diagram of further detail of selected components of the example system, according to an embodiment of the invention.

FIG. 2 depicts a high-level block diagram of further detail of selected components of the example system, according to an embodiment of the invention. The example system includes a control server computer system 100 connected to client computer systems 132-1 and 132-2 and content server computer systems 180-1 and 180-2 via the network 130, according to an embodiment of the present invention. The client computer systems 132-1 and 132-2 are examples of the client computer system 132 (FIG. 1). The content server computer systems 180-1 and 180-1 are examples of the content server 180 (FIG. 1). Although two client computer systems 132-1 and 132-2 and two content servers 180-1 and 180-2 are shown, any number of them may be present.

The control server 100 includes the time client 150, the time server 152, and the synchronization controller 154. The respective client computer systems 132-1 and 132-2 include respective time clients 196-1 and 196-2 and respective synchronization clients 198-1 and 198-2. The time clients 196-1 and 196-2 are examples of the time clients 196 (FIG. 1). The synchronization clients 198-1 and 198-2 are examples of the synchronization client 198 (FIG. 1). The respective content servers 180-1 and 180-2 include respective time clients 186-1 and 186-2, respective distributors 188-1 and 188-2, and respective content 189-1 and 189-2. The time clients 186-1 and 186-2 are examples of the time client 186 (FIG. 1). The distributors 188-1 and 188-2 are examples of the distributor 188 (FIG. 1). The content 189-1 and 189-2 are examples of the content 189 (FIG. 1).

Figure 3A:
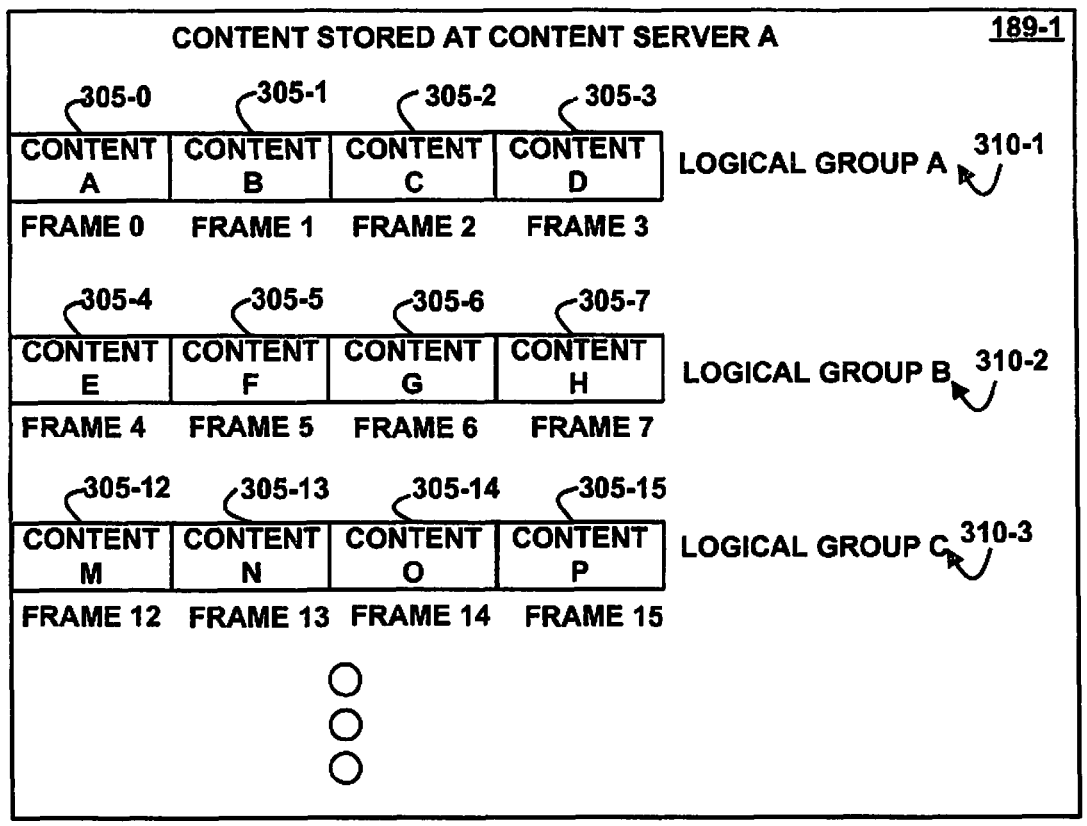
FIG. 3A depicts a block diagram of example content stored at a content server, according to an embodiment of the invention.

FIG. 3A depicts a block diagram of example content 189-1, according to an embodiment of the invention. The example content 189-1 is stored at the content server 180-1. The content 189-1 includes example frames 305-0, 305-1, 305-2, 305-3, 305-4, 305-5, 305-6, 305-7, 305-12, 305-13, 305-14, and 305-15, having respective frame numbers of frame 0, frame 1, frame 2, frame 3, frame 4, frame 5, frame 6, frame 7, frame 12, frame 13, frame 14, and frame 15, and respective content of content A, content B, content C, content D, content E, content F, content G, content H, content M, content N, content O, and content P.

A frame represents material or data that may be presented or played via the I/O device 192 at any one time. For example, if the frames include video, a frame is a still image, and displaying frames in succession over time (displayed in a number of frames per second), in frame number order, creates the illusion, to the viewer, of motion or a moving picture. Frames per second (FPS) is a measure of how much information is used to store and display motion video. Frames per second applies equally to film video and digital video. The more frames per second, the smoother the motion appears. Television in the United States, for example, is based on the NTSC (National Television System Committee) format, which displays 30 interlaced frames per second while movies or films commonly display 24 frames per second.

But, in other embodiments, any number of frames per second and any appropriate format or standard for storing and presenting the content 189-1 may be used. Embodiments of the invention may include video only, video and audio, audio only, or still images. Examples of various standards and formats in which the frames may be stored include: PAL (Phase Alternate Line), SECAM (Sequential Color and Memory), RS 170, RS 330, HDTV (High Definition Television), MPEG (Motion Picture Experts Group), DVI (Digital Video Interface), SDI (Serial Digital Interface), MP3, QuickTime, RealAudio, and PCM (Pulse Code Modulation).

In other embodiments, the frames represent network frames, which are blocks of data that are transmitted together across the network 130, and multiple network frames may be necessary to compose one movie or television frame. The content of the frames may include movies, television programs, educational programs, instructional programs, training programs, audio, video, advertisements, public service announcements, games, text, images, or any portion, combination, or multiple thereof. In addition to the displayable or presentable data, the frames may also include other information, such as control information, formatting information, timing information, frame numbers, sequence numbers, and identifiers of the programs and/or target clients.

The frame numbers represent the sequence or order that the frames are to be presented, played, or displayed via user I/O device 192, but the frames may be transmitted across the network 130 in a different order, as further described below. The frame numbers within the content 189-1 are not necessarily sequential within the content 189-1, e.g., the frame 305-7 is frame number 7 while the next frame 305-12 within the content 189-1 is frame number 12 because the frame numbers 8, 9, 10, and 11 (which are missing in the content 189-1) are supplied to the client by another content server (the content server 180-2, in this example) and are inter-spliced together into the displayed or played content by the target client, as further described below with reference to FIGS. 6 and 7.

The frames are organized into logical groups 310-1, 310-2, and 310-3. The logical group 310-1 includes frames 305-0, 305-1, 305-2, and 305-3. The logical group 310-2 includes frames 305-4, 305-5, 305-6, and 305-7. The logical group 310-3 includes frames 305-12, 305-13, 305-14, and 305-15. Logical groups are the units of the content that the distributor 188 transmits to the client(s) at any one time (during the time between two consecutive time reference points, as further described below with reference to FIG. 5).

In an embodiment, the number of frames in a logical group is the play (or display) frame rate (the number of frames per second displayed or played at the I/O device 192) multiplied by the round trip latency of the logical group when transferred between the content server and the target client. The round trip latency is the amount of time needed for the distributor 188 to send a logical group of frames to the target client and receive an optional acknowledgment of receipt of the logical group from the target client. If the optional acknowledgment is not used, then the round trip latency is the transfer time of the logical group, i.e., the amount of time needed to transfer the logical group from the content server to the target client.

Figure 3B:
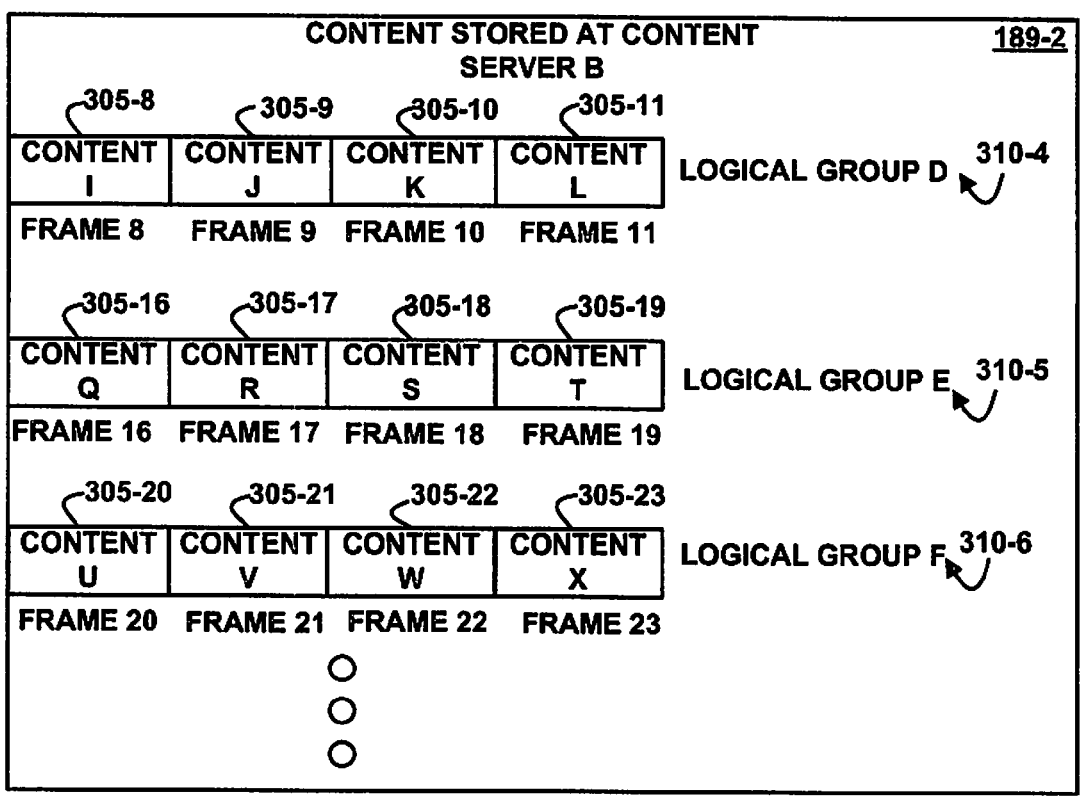
FIG. 3B depicts a block diagram of example content stored at another content server, according to an embodiment of the invention.

FIG. 3B depicts a block diagram of example content 189-2, according to an embodiment of the invention. The example content 189-2 is stored at the content server 180-2. The content 189-2 includes example frames 305-8, 305-9, 305-10, 305-11, 305-16, 305-17, 305-18, 305-19, 305-20, 305-21, 305-22, and 305-23, having respective frame numbers of frame 8, frame 9, frame 10, frame 11, frame 16, frame 17, frame 18, frame 19, frame 20, frame 21, frame 22, and frame 23, storing respective content of content I, content J, content K, content L, content Q, content R, content S, content T, content U, content V, content W, and content X.

The frame numbers represent the sequence or order that the frames are to be presented, played, or displayed via user I/O device 192, but the frames may be transmitted across the network 130 in a different order, as further described below. The frame numbers are not necessarily sequential within the content 189-2, e.g., the frame 305-11 is frame number 11 while the next frame 305-16 within the content 189-2 is frame number 16 because the frame numbers 12, 13, 14, and 15 (which are missing in the content 189-2) are supplied to the client by another content server (the content server 180-1, in this example) and are inter-spliced together into the displayed or played content by the target client, as further described below with reference to FIGS. 6 and 7.

The frames are organized into logical groups 310-4, 310-5, and 310-6. The logical group 310-4 includes frames 305-8, 305-9, and 305-11. The logical group 310-5 includes frames 305-16, 305-17, 305-18, and 305-19. The logical group 310-6 includes frames 305-20, 305-21, 305-22, and 305-23.

FIG. 4 depicts a block diagram of an example schedule 156, according to an embodiment of the invention. The schedule 156 represents a plan for interleaving the transmission of content from different content servers during different time periods. The synchronization controller 154 sends the schedule 156 to the time clients 186 and 196 at the content servers 180 and the clients 132, which use it to schedule the transmission of content from the content servers 180 to the clients 132. The example schedule 156 includes example records 405, 410, 415, and 420, each of which includes an example content server identifier field 425, a content identifier field 430, an initial time reference point field 435, a number of logical groups field 440, and a client identifier field 445.

The content server identifier field 425 identifies a particular content server 180 that is to send the content represented by the respective record. Thus, the records 405 and 410 represent a schedule for the content server A 180-1 while the records 415 and 420 represent a schedule for the content server B 180-2. In an embodiment, each content server receives its respective records (those records with a content server identifier 425 that identify it), but not the records representing the schedule of other content servers. Thus, the content server A 180-1 receives the records 405 and 410 while the content server B 180-2 receives the records 415 and 420.

The content identifier field 430 identifies the content 189 that is to be transmitted by the content server identified by the content server identifier field 425. In various embodiments, the content identifier field 430 may specify the content in terms of a program name or identifier, logical group identifiers, or frame identifiers. In various embodiments, the content identifier 430 may specify an initial logical group or multiple logical groups.

The time reference point field 435 identifies one or more time reference points, at which the content server 425 is to transmit the associated respective logical groups of content 430. Each of the initial time reference points 435 in the different records 405, 410, 415, and 420 are different because the client identified by the client identifier 445 receives one logical group from one content server starting at any one time reference point during any during any one associated time period, so that the client does not need to buffer or save the logical groups and can play the frames of the logical group in the next time period (following the time period during which the logical group was received) in a just-in-time manner.

The number of logical groups field 440 identifies the number of logical groups identified by the content identifier 430 that the content server 425 is to transmit, starting at the initial time reference point 435 and continuing for a number of time periods (and number of time reference points) equal to the number of logical groups 440. The client identifier field 445 identifies the client 132 that is to receive the content 430 represented by the record.

The schedule 156 further includes a logical group size (the number of frames in a logical group) field 450 and an amount of time between time reference points field 455, which are received by all of the content servers identified by the content server identifiers 425. The logical group size (the number of frames in a logical group) field 450 specifies the number or count of frames that are included in each logical group. In the examples of FIGS. 3A and 3B, each logical group 310-1, 310-2, 310-3, 310-4, 310-5, and 310-6 includes four frames. In an embodiment, the number of frames in a logical group is the play (or display) frame rate (the number of frames per second played or displayed at the I/O device 192) multiplied by the round trip latency of the logical group when transferred between the content server and the target client. The round trip latency is the amount of time needed for the distributor 188 to send a logical group of frames to the target client and receive an optional acknowledgment of receipt of the logical group from the target client. The amount of time between time reference points field 455 identifies the amount of elapsed time needed to play a logical group of frames at the client. In an embodiment, the amount of time between the time reference points field 455 represents the number of frames in a logical group divided by the play (or display) frame rate (the number of frames per second played or displayed at the I/O device 192).

Figure 5:
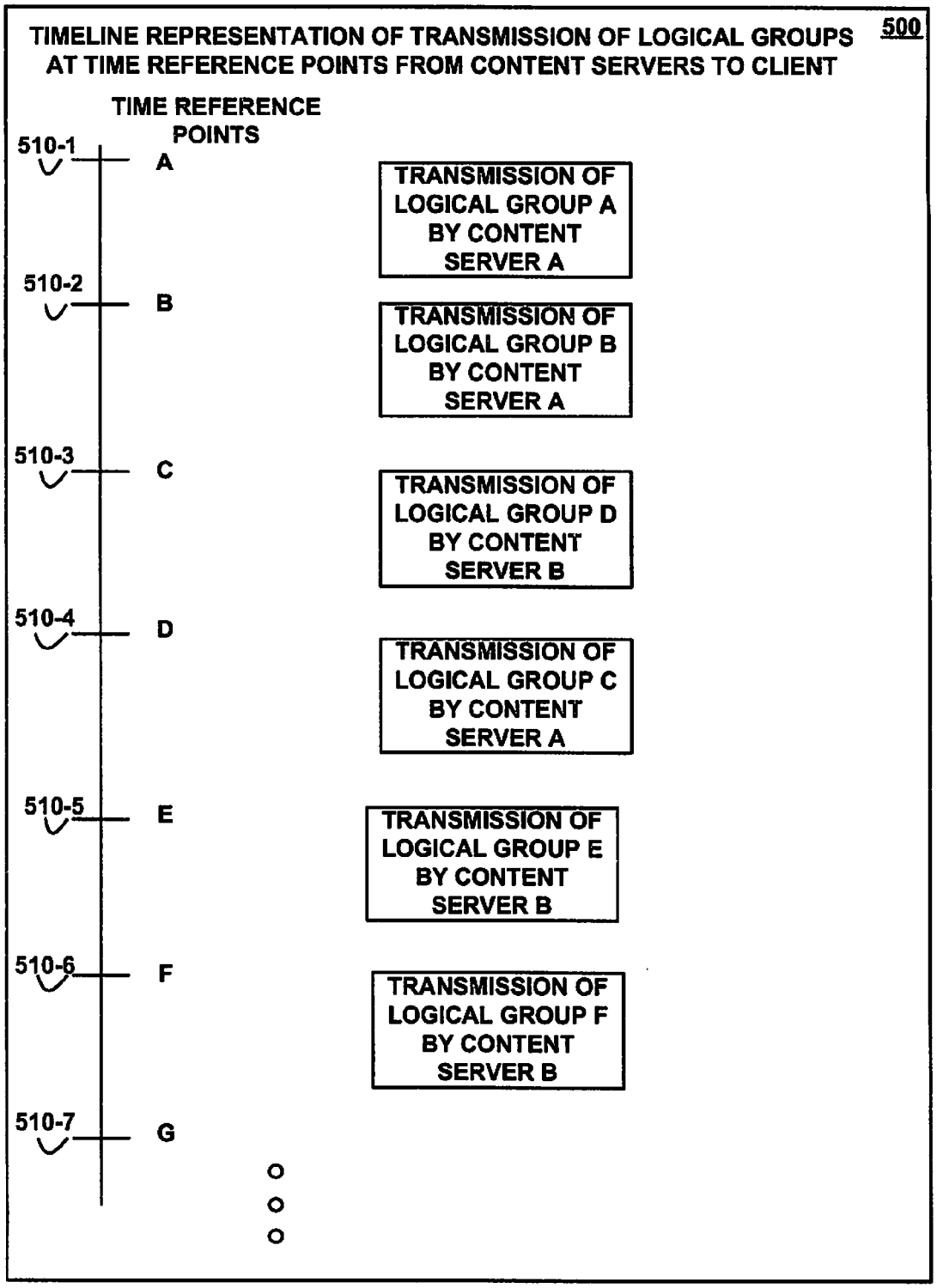
FIG. 5 depicts a block diagram of an example timeline of the transmission of content, according to an embodiment of the invention.

FIG. 5 depicts a block diagram of an example timeline 500 for transmission of content from the content servers to the clients, according to an embodiment of the invention. The example time line 500 includes example time reference points A 510-1, B 510-2, C 510-3, D 510-4, E 510-5, F 510-6, and G 510-7. The time reference point A 510-1 is the initial time reference point, at which time the content servers 180 begin transmission of the content to the client(s) 132. The time reference point B 510-2 is after the time reference point A 510-1 in time, the time reference point C 510-3 is after the time reference point B 510-2 in time, the time reference point D 510-4 is after the time reference point C 510-3 in time, the time reference point E 510-5 is after the time reference point D 510-4 in time, the time reference point F 510-6 is after the time reference point E 510-5 in time, and the time reference point G 510-7 is after the time reference point F 510-6 in time. The time reference points 510-1, 510-2, 510-3, 510-4, 510-5, 510-6, and 510-7 are the points in time at which the content servers 180 begin transmission of a respective logical group of frames to the client(s) 132.

For example, starting at the initial time reference point A 510-1 and continuing to no later than the time reference point B 510-2, the content server A 180-1 transmits the logical group A 310-1 to the requesting client(s), as specified by the record 405 in the schedule 156. Subsequently, starting at the time reference point 510-2, and continuing to no later than the time reference point 510-3, the content server A 180-1 transmits the logical group B 310-2 to the requesting client(s), as specified by the record 405 in the schedule 156. Subsequently, starting at the time reference point 510-3, the content server B 180-2 transmits the logical group D 310-4 to the requesting client(s), as specified by the record 415 in the schedule 156. Subsequently, starting at the time reference point 510-4, the content server A 180-1 transmits the logical group C 310-3, as specified by the record 410 in the schedule 156. Subsequently, starting at the time reference point 510-5, the content server B 180-2 transmits the logical group E 310-5, as specified by the record 420 in the schedule 156. Subsequently, starting at the time reference point 510-6, the content server B 180-2 transmits the logical group F 310-6, as specified by the record 420 in the schedule 156. The transmission of logical groups continues until the content servers 180 have transmitted all of the requested content to the requesting client(s) 132 specified by the schedule 156.

Figure 6:
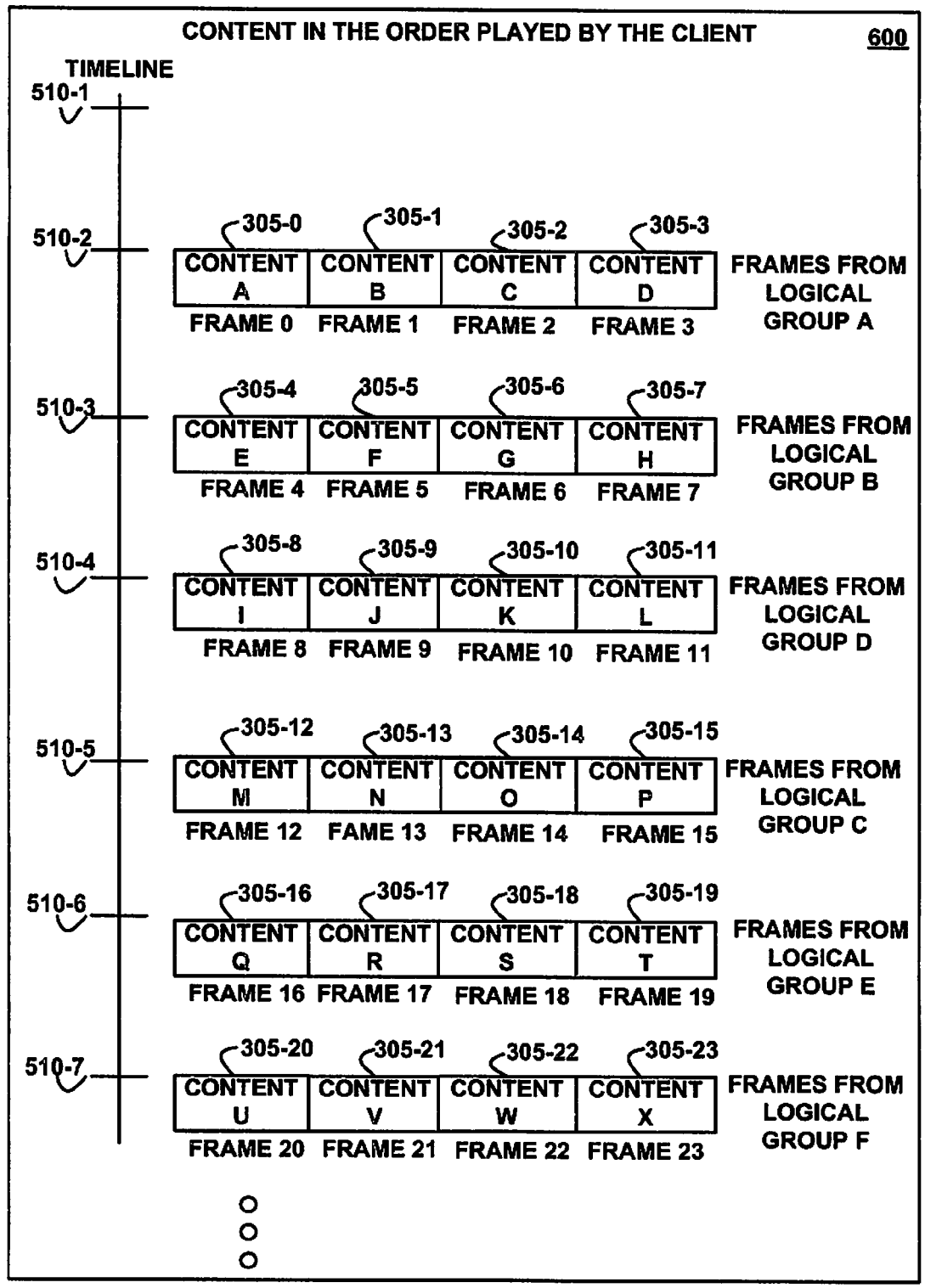
FIG. 6 depicts a block diagram of an example timeline of play of the content at a client, according to an embodiment of the invention.

FIG. 6 depicts a block diagram of an example content in the order as played by a client, according to an embodiment of the invention. The client plays the logical groups in the order that they are received, but does not necessarily play the frames within each logical group in the order that the client receives the frames within the logical group. Instead, the client reorders the frames into the order specified by their frame number and plays, presents, or displays the frames in frame number order (the play order) on the I/O device 192.

Using the example of FIGS. 3 and 4, the client plays frames in the order of frame number frame 0, frame 1, frame 2, frame 3, frame 4, frame 5, frame 6, frame 7, frame 8, frame 9, frame 10, frame 11, frame 12, frame 13, frame 14, frame 15, frame 16, frame 17, frame 18, frame 19, frame 20, frame 21, frame 22, and frame 23. Thus, the client displays the frames in the order of frame 305-0, 305-1, 305-2, 305-3, 305-4, 305-5, 305-6, 305-7, 305-8, 305-9, 305-10, 305-11, 305-12, 305-13, 305-14, 305-15, 305-16, 305-17, 305-18, 305-19, 305-20, 305-21, 305-22, and 305-23. In this way, the content is played in the order of content of content A, content B, content C, content D, content E, content F, content G, content H, content I, content J, content K, content L, content M, content N, content O, content P, content Q, content R, content S, content T, content U, content V, content W, and content X.

The client 132 does not play any frames at time reference point 510-1 because the client 132 is receiving the frames in the first logical group 310-1 at this time reference point and does not yet have sufficient frames to play them. The client plays the frames 305-0, 305-1, 305-2, and 305-3 (all from the logical group 310-1, which was received between the time reference points 510-1 and 510-2 as illustrated in FIG. 5) starting at the time of the time reference point 510-2. The client plays the frames 305-4, 305-5, 305-6, and 305-7 (from the logical group B 310-2, which was received between the time reference points 510-2 and 510-3 as illustrated in FIG. 5) starting at the time of the time reference point 510-3. The client plays the frames 305-8, 305-9, 305-10, and 305-11 (from the logical group D 310-4, which was received between the time reference points 510-3 and 510-4 as illustrated in FIG. 5) starting at the time of the time reference point 510-4. The client plays the frames 305-12, 305-13, 305-14, and 305-15 (from the logical group C 310-3, which was received between the time reference points 510-4 and 510-5 as illustrated in FIG. 5) starting at the time of the time reference point 510-5. The client plays the frames 305-16, 305-17, 305-18, and 305-19 (from the logical group E 310-5, which was received between the time reference points 510-5 and 510-6 as illustrated in FIG. 5) starting at the time of the time reference point 510-6. The client plays the frames 305-20, 305-21, 305-22, and 305-23 (from the logical group F 310-6, which was received between the time reference points 510-6 and 510-7 as illustrated in FIG. 5) starting at the time of the time reference point 510-7.

Thus, the client plays each logical group in the time period that follows after the time period in which that logical group was received, in a just-in-time manner, meaning that multiple logical groups, in an embodiment, need not be buffered or saved by the client prior to playing them.

Figure 7:
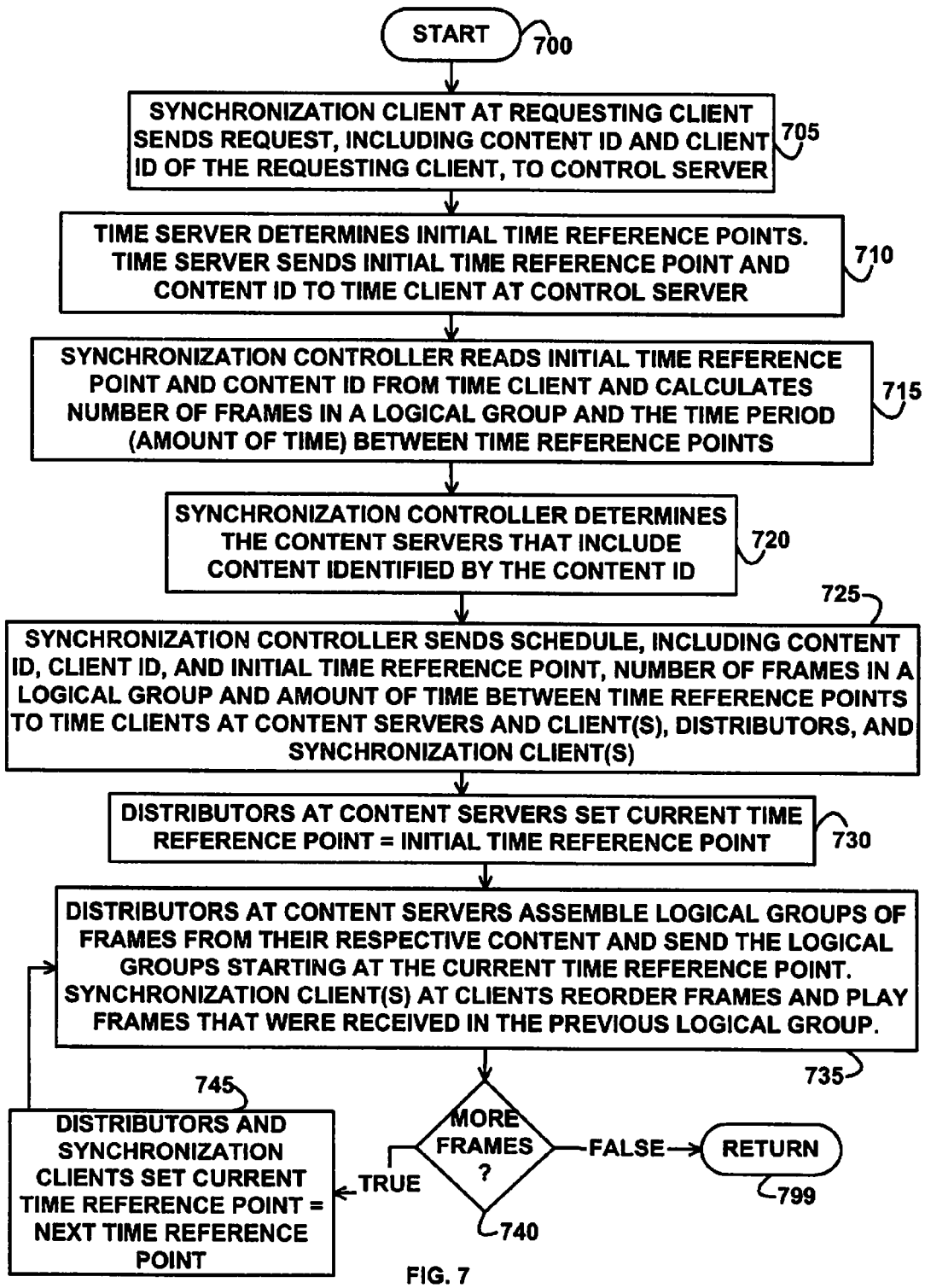
FIG. 7 depicts a flowchart of example processing, according to an embodiment of the invention.

FIG. 7 depicts a flowchart of example processing, according to an embodiment of the invention. Control begins at block 700. Control then continues to block 705 where the synchronization client 198-1 at the client 132-1 (and optionally the synchronization client 198-2 at the client 132-2) sends a request, including a content identifier and a client identifier of the requesting client 132-1 (and optionally the client 132-2), to the control server 100. The request is a request that the content identified by the content identifier be transmitted to the client. In an embodiment, the request identifies the initial time reference point 510-1 at which the client desires to begin receiving the content. In another embodiment, the request includes an indication that the client desires to begin receiving the content as soon as possible. In an embodiment, the times are synchronized between the synchronization clients via a protocol, such as Network Time Protocol (NTP), which uses Coordinated Universal Time (UTC) to synchronize computer clock times. In various embodiments, the UTC time is obtained using radio and satellite systems.

Control then continues to block 710 where the time server 152 at the control server 100 determines the initial time reference point 510-1. In an embodiment, the time server 152 determines the initial time reference point 510-1 to be the time reference point that was included in the request. In another embodiment, the control server determines the initial time reference point 510-1 to be the earliest time that the content servers 180 that include the requested content are available and have sufficient bandwidth to send the requested content to the requesting client(s). The time server 152 sends the initial time reference point 510-1 and the content identifier of the requested content to the time client 150 at the control server 100.

Control then continues to block 715 where the synchronization controller 154 at the control server 100 reads the determined initial time reference point 510-1 and the content identifier from the time client 150 and calculates the size of the logical groups (the number of frames in a logical group) and determines the amount of time (a time period) between the time reference points, e.g., the amount of time between the time reference points 510-1 and 510-2, between the time reference points 510-2 and 510-3 between the time reference points 510-3 and 510-4, between the time reference points 510-4 and 510-5, between the time reference points 510-5 and 510-6, and between the time reference points 510-6 and 510-7. In an embodiment, the synchronization controller 154 calculates the logical group size to be the play (or display) frame rate (the number of frames per second displayed or played at the I/O device 192) multiplied by the round trip latency of the logical group when transferred between the content server and the target client(s). For example, if the play (or display) frame rate is 30 frames per second and the round trip latency is 3 seconds, then the logical group size (the number of frames in each of the logical groups 310-1, 310-2, 310-3, 310-4, 310-5, and 310-6) is the play (or display) frame rate multiplied by the round trip latency, or 30 frames/second*3 seconds=90 frames.

The round trip latency is the amount of time needed for the distributor 188 to send a logical group of frames to the target client(s) and receive an optional acknowledgment of receipt of the logical group from the target client(s). In an embodiment, the synchronization controller 154 sets the amount of time (the time period) between the time reference points to be the round trip latency of sending frames to the client and receiving an optional acknowledgment.

Control then continues to block 720 where the synchronization controller 154 determines or finds the content servers 180-1 and 180-2 that include the requested content 189-1 and 189-2 identified by or associated with the content identifier. In an embodiment, the content identifier only identifies a portion of the content, e.g., only the content 189-1, and the synchronization controller 154 determines other associated content (e.g., the content 189-2 at the content server 180-2) on its own initiative. For example, if the requested content 189-1 is a movie or television program, the synchronization controller may select the content 189-2 to be advertisements, public service announcements, previews or trailers of coming attractions, weather reports, special news bulletins, operating instructions, supplemental documentation, or any other appropriate content not explicitly requested by the client, but transmitted to the client, nonetheless.

Control then continues to block 725 where the synchronization controller 154 sends the schedule 156, including the content identifier 430, the time reference points 435, the number of logical groups 440, the client identifier(s) 445, the number of frames in a logical group 450, and the amount of time between the time reference points 455 to the time clients 186-1, 186-2 at the determined content servers 180-1 and 180-2, and to the time clients 196-1 (and optionally 196-2) at the client computer system 132-1 (and optionally 132-2), the distributors 188-1 and 188-2, and the synchronization client (s). Control then continues to block 730, where the distributors 188-1 and 188-2 at the respective content servers 180-1 and 180-2 set the current time reference point to be the initial time reference point 510-1 specified by the time reference point 435 in the schedule 156.

Control then continues to block 735, which represents the start of a loop that is executed once for each logical group (once for each time period between two time reference points). At block 735, the distributors 188-1 and 188-2 assemble logical groups of frames from their respective content 189-1 and 189-2 specified by a record in the schedule 156 and send the logical groups of frames over the network 130 to the client(s) 445, starting at the time of the current time reference point and continuing no later than the next time reference point, as previously described above with reference to FIG. 5. The synchronization client(s) 198-1 (and optionally 198-2) receive the transmitted frames and reorder the frames within the logical group to the play (or display) frame order (the order of FIG. 6). The synchronization clients 198-1 (and optionally 198-2) further play, present, or display the frames of the logical group that was received in the previous time period via their I/O devices 192. Thus, the clients receive a logical group in one time period and play it in the next time period, as previously described above with reference to FIGS. 5 and 6.

Control then continues to block 740 where the distributors 188-1 and 188-2 determine whether any more frames in the content remain to be sent to the client(s). If the determination at block 740 is true, then more frames in the content remain to be sent, so control continues to block 745 where the distributors 188-1 and 188-2 set the current time reference point to be the next time reference point. Control then returns to block 735, as previously described above.

If the determination at block 740 is false, then all frames have been sent to the clients, so control continues to block 799 where the logic of FIG. 7 returns.

The previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   receiving, at a control server, a request from a client, wherein the request comprises a content identifier;
   determining, at the control server, a plurality of content servers that store a plurality of frames, wherein the frames are associated with the content identifier; determining, at the control server, a plurality of schedules, wherein each of the plurality of schedules comprises a respective initial time reference point and a respective number of logical groups of the frames, wherein each of the initial time reference points represents a different point in time;
   sending, from the control server, each of the plurality of schedules to a respective content server, wherein the respective content server sends its respective number of logical groups of the frames, starting at its respective initial time reference point, to the client wherein the client reorders the frame, within the respective Logical group, from a received order to a play order and plays the frames in the play order, wherein the play order comprises a frame number order;
   wherein each of plurality of the schedules further comprises a time period, wherein the determining the plurality of schedules further comprises: determining the time period that comprises an amount of time between each of a plurality of time reference points, wherein the plurality of content servers send the logical groups of frames to the client at the respective time reference points; and wherein the respective content server sends to the client one of the logical groups of the frames starting at a respective one of the time reference points during one of the time periods, and the client plays the one of the logical groups starting at a next time reference point during a next time period following the one time reference point and the one time period.

2. The method of claim 1, wherein the determining the plurality of schedules further comprises:
determining the time period to be a round trip latency of sending the logical group of the frames to the client.

3. The method of claim 2, wherein each of the plurality of schedules further comprises a logical group size, wherein the determining the plurality of schedules further comprises: setting the logical group size to be a play frame rate when played by the client multiplied by the round trip latency.

4. A method for deploying computing services, comprising: integrating computer readable code into a computer system, wherein the code in combination with the computer system performs the method of claim 1.

5. A non-transitory storage medium encoded with instructions, wherein the instructions when executed on a processor comprise:
receiving, at a control server, a request from a client, wherein the request comprises a content identifier;
determining, at the control server, a plurality of content servers that store a plurality of frames, wherein the frames are associated with the content identifier;
determining, at the control server, a plurality of schedules, wherein each of the plurality of schedules comprises a respective initial time reference point and a respective number of logical groups of the frames, wherein each of the initial time reference points represents a different point in time;
sending, from the control server, each of the plurality of schedules to a respective content server, wherein the respective content server sends its respective number of logical groups of the frames, starting at its respective initial time reference point, to the client, wherein the client reorders the frames, within the respective logical group, from a received order to a play order and plays the frames in the play order, wherein the play order comprises a frame number order;
wherein each of the plurality of schedules further comprises a time period, wherein the determining the plurality of schedules further comprises: determining the time period that comprises an amount of time between each of a plurality of time reference points, wherein the plurality of content servers send the logical groups of frames to the client at the respective time reference points; and
wherein the respective content server sends to the client one of the logical groups of the frames starting at a respective one of the time reference points during one of the time periods, and the client plays the one of the logical groups starting at a next time reference point during a next time period following the one time reference point and the one time period.

6. The non-transitory storage medium of claim 5, wherein the determining the plurality of schedules further comprises:
determining the time period to be a round trip latency of sending the logical group of the frames to the client.

7. The non-transitory storage medium of claim 6, wherein each of the plurality of schedules further comprises a logical group size, wherein the determining the plurality of schedules further comprises setting the logical group size to be a play frame rate when played by the client multiplied by the round trip latency.

8. A computer system comprising:
a processor; and
a memory connected to the processor, wherein the memory encodes instructions that when executed by the processor comprise:
receiving a request from a client, wherein the request comprises a content identifier;
determining a plurality of content servers that store a plurality of frames, wherein the frames are associated with the content identifier;
determining a plurality of schedules, wherein each of the plurality of schedules comprises a respective initial time reference point and a respective number of logical groups of the frames, wherein each of the initial time reference points represents a different point in time;
sending each of the schedules to a respective content server, wherein each of the respective content server sends its respective number of logical groups of the frames, starting at its respective initial time reference point, to the client, wherein the client reorders the frames, within the respective logical group, from a received order to a play order and plays the frames in the play order, wherein the play order comprises a frame number order;
wherein each of the schedules further comprises a time period, wherein the determining the plurality of schedules further comprises: determining the time period that comprises an amount of time between each of a plurality of time reference points, wherein the plurality of content servers send the logical groups of frames to the client at the respective time reference points; and
wherein the respective content server sends one of the logical groups of the frames to the client starting at a respective one of the time reference points during one of the time periods, and the client plays the one of the logical groups starting at a next time reference point during a next time period following the one time reference point and the one time period.

9. The computer system of claim 8, wherein the determining the plurality of schedules further comprises:
determining the time period to be a round trip latency of sending the logical group of the frames to the client.

10. The computer system of claim 9, wherein each of the plurality of schedules further comprises a logical group size, wherein the determining the plurality of schedules further comprises: setting the logical group size to be a play frame rate when played by the client multiplied by the round trip latency.

* * * * *